(12) United States Patent
Krasser et al.

(10) Patent No.: US 9,452,498 B2
(45) Date of Patent: Sep. 27, 2016

(54) PROCESS FOR MANUFACTURING A YANKEE CYLINDER

(75) Inventors: Josef Krasser, Rein (AT); Markus Maier, Lassnitzhohe (AT); Ludwig Kahsiovsky, Weinitzen (AT)

(73) Assignee: Andritz AG, Graz (AT)

( * ) Notice: Subject to any disclaimer, the term of this patent is extended or adjusted under 35 U.S.C. 154(b) by 199 days.

(21) Appl. No.: 14/006,266

(22) PCT Filed: Mar. 19, 2012

(86) PCT No.: PCT/EP2012/001199
§ 371 (c)(1),
(2), (4) Date: Oct. 16, 2013

(87) PCT Pub. No.: WO2012/126602
PCT Pub. Date: Sep. 27, 2012

(65) Prior Publication Data
US 2014/0026418 A1  Jan. 30, 2014

(30) Foreign Application Priority Data

Mar. 21, 2011 (AT) .................................. A 396/2011
Sep. 5, 2011 (EP) ..................................... 11007162

(51) Int. Cl.
| | | |
|---|---|---|
| B23K 37/00 | (2006.01) |
| D21F 5/00 | (2006.01) |
| B23K 37/08 | (2006.01) |
| B23K 37/02 | (2006.01) |
| D21F 5/02 | (2006.01) |
| D21F 5/18 | (2006.01) |

(52) U.S. Cl.
CPC .............. *B23K 37/08* (2013.01); *B23K 37/02* (2013.01); *D21F 5/021* (2013.01); *D21F 5/181* (2013.01); *Y10T 29/49393* (2015.01)

(58) Field of Classification Search
None
See application file for complete search history.

(56) References Cited

U.S. PATENT DOCUMENTS

| | | | | |
|---|---|---|---|---|
| 3,060,592 A * | 10/1962 | Ostertag, Jr. | ................ | 34/124 |
| 4,196,689 A * | 4/1980 | Wolf et al. | .................. | 165/91 |
| 4,320,582 A * | 3/1982 | Klippstein et al. | ............ | 34/454 |
| 6,942,139 B2 * | 9/2005 | Lipnevicius | ................ | 228/102 |
| 7,802,412 B2 * | 9/2010 | Jensen | ..................... | 52/651.07 |
| 8,398,822 B2 * | 3/2013 | Mennucci et al. | ............ | 162/357 |
| 8,438,752 B2 * | 5/2013 | Mennucci et al. | ............ | 34/117 |
| 2002/0079303 A1 * | 6/2002 | Offer et al. | ............... | 219/137 R |
| 2007/0289156 A1 | 12/2007 | Kloibhofer et al. | | |

FOREIGN PATENT DOCUMENTS

| | | |
|---|---|---|
| CN | 1105079 A | 7/1995 |
| CN | 101941112 A | 1/2011 |
| WO | 2008040844 A1 | 4/2008 |
| WO | 2008105005 A1 | 9/2008 |
| WO | 2011030363 | 3/2011 |

* cited by examiner

*Primary Examiner* — Devang R Patel
(74) *Attorney, Agent, or Firm* — Alix, Yale & Ristas, LLP

(57) ABSTRACT

The invention relates to a process for manufacturing a steel Yankee cylinder (1), where the Yankee cylinder (1) is welded together from individual pre- or finish-machined cylinder sections (8, 9, 10). In this case, the individual cylinder sections (8, 9, 10) are not welded together at the manufacturing location of the cylinder sections (8, 9, 10), but at an assembly location away from the manufacturing location, preferably on the works premises of the customer.

18 Claims, 2 Drawing Sheets

PROCESS FOR MANUFACTURING A YANKEE CYLINDER

Figure 1:
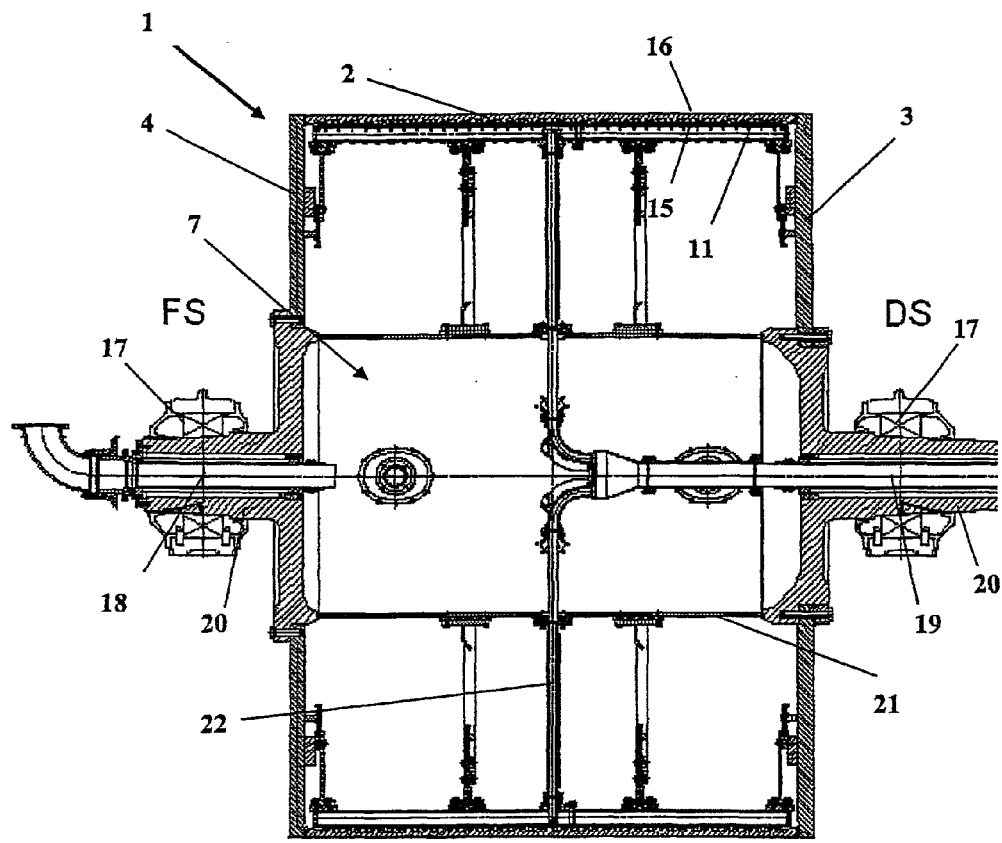

The subject of the invention is a process for manufacturing a steel Yankee cylinder.

So-called Yankee cylinders are commonly used in the drying process for the production of paper webs or tissue. Here, the damp pulp web is transferred from a machine clothing to the rotating Yankee cylinder; it dries on the surface of the cylinder in a fraction of a second and is then removed from it again with the aid of doctors.

Yankee cylinders usually have a very large diameter. They are heated from the inside using steam and they are difficult to manufacture because of the very stringent demands to be met relating to the internal pressures the cylinder must cope with, the cylinder's leak-tightness, and its large diameter.

Standard Yankee cylinders have the following dimensions, for example:

Cylinder diameter: 2000 mm to 6500 mm
Diameter of hollow shaft: 1000 mm to 2500 mm
Cylinder length: 3000 mm to 8500 mm
Cylinder mass: 35 t to 140 t The vast majority of these cylinders are made of cast iron, however Yankee cylinders made of steel are also known from U.S. Pat. No. 4,196,689 and from WO 2008/105005 A1.

Normally, a Yankee cylinder consists of a cylindrical shell surface, which is closed at the ends with end covers. The two covers can either be bolted or welded to the cylinder shell.

A Yankee cylinder rotates via journals and has a hollow shaft or axle inside through which the steam for heating the cylinder is introduced and exhaust steam and condensate can be removed.

The cylinder shell often has a large number of grooves on its inner surface, which improve heat transition from the heated inside of the cylinder to the cylinder surface, without substantially diminishing the component strength of the shell.

Conventional Yankee cylinders made of cast iron are always manufactured at a particular manufacturing site and transported in one piece to the future place of operation. So far, Yankee cylinders made of steel also always had to be manufactured at a specific manufacturing location In the conventional method for manufacture of steel cylinders, individual shell plates are cut, curled, and then welded together to form a finished cylinder shell. The finished cylinder shell then undergoes time-consuming machining on the inside as well as the outside, particularly lathing. Very large lathes in which a Yankee cylinder can be machined vertically are needed for this. There are only a few plant engineering companies able to machine a Yankee cylinder that is over 6 meters long.

With this conventional manufacturing technique, it is impossible to supply many potential customers with cylinders more than 6.5 m in diameter and 6 m wide because there is often no way of delivering such large and heavy components to the customer or because transport of this kind would involve too much effort and expense.

The aim of the invention is thus to describe a manufacturing process for a Yankee cylinder that makes it possible to also supply a large Yankee cylinder to customers who could not be supplied previously because of the difficulties involved in transport.

The manufacturing process for the steel Yankee cylinder according to the invention comprises the following steps:

a.) Cutting and curling the individual shell plates at a specific manufacturing location;

b.) Welding the shell plates together to form two or more cylinder sections at the manufacturing location;

c.) Transport of the individual cylinder sections from the manufacturing location to an assembly location;

d.) Welding the cylinder sections together at the assembly location to form a complete Yankee cylinder shell.

Thus, the invention is based on manufacturing shorter cylinder sections and then delivering them from the manufacturing location, for example a plant engineering company, to the final assembly location. The individual cylinder sections are not welded together to form the complete cylinder shell of the Yankee cylinder until they reach the place of assembly.

Within the meaning of the present invention, the place of assembly is a place where the individual cylinder sections are welded together and which is not on the works premises of the manufacturing location.

The individual cylinder sections are transported to the place of assembly either overland on suitable transport vehicles (heavy goods vehicles) or by ship.

The place of assembly is then preferably in the immediate vicinity of the future place of operation of the Yankee cylinder, which place of location is preferably on the works premises of a paper machine or tissue machine operator. The single cylinder sections, preferably with the end covers already mounted at the end faces, can be delivered to the customer individually much more easily and much cheaper than fully assembled cylinders.

It is favourable if the individual cylinder sections have been finish-machined on a lathe on the inside and also on their respective end faces, as the case may be, at the manufacturing location.

During this lathing work on the inside, the cylinder wall is smoothed on the one hand, and an exact cylinder shape is produced on the other hand. The Yankee cylinder should preferably have grooves in circumferential direction on the inside as this enhances heat transfer from the steam to the cylinder wall.

These grooves are preferably made at the manufacturing location.

Preferably, the outside of the individual cylinder sections is also finish-machined on a lathe at the manufacturing location.

As a result of the process according to the invention, it is now also possible to produce very large Yankee cylinders with a length of 6 meters, for example, with relatively small lathing machines.

As a result, no large machine tools are needed for the entire machining work on the cylinder shell, i.e. for lathing and milling work.

The entire cylinder shell only needs to be ground after welding. The grinding device, however, is primarily an auxiliary structure that is much less complex than a lathing machine.

It is favourable if the individual cylinder sections are welded according to step d.), at least from one side, by a mobile welding robot or an electro-mechanical welding carriage that runs on an auxiliary rail mounted on the cylinder sections.

A mobile welding robot is a welding robot that can be transported easily and with little expense and effort to different places of use. Narrow gap welding robots and electro-mechanical welding carriages have proved particularly useful in this work. It is thus possible to finish assembling the Yankee cylinder at the customer's site without the customer being in possession of special machine tools or welding equipment.

Then it is also possible to finish-machine the outside of the individual cylinder section on site or in the vicinity of the place of operation.

It is favourable if the two end covers are joined, preferably welded, to the respective cylinder shells at the manufacturing location because the end covers stabilize the cylinder sections during transport.

It is also wise to stabilize the respective cylinder sections in addition with an auxiliary structure made of steel, for example steel rings, during transport from the manufacturing location to the place of operation.

In order to ensure that the geometric shape of the cylinder is not altered due to welding distortion or shrinkage, a suitable welding process must be selected with which to join the individual cylinder sections to form a complete cylinder. It has proved very favourable to use the narrow gap welding process to weld the cylinder sections together. In addition to the excellent welding quality, this also guarantees only marginal welding shrinkage. Any counter-welding required from the other side can be performed using normal welding processes.

It is favourable if the internal weld—the seam on the inside of the cylinder—is made with the narrow gap welding process as this weld contributes substantially to the stability of the Yankee cylinder. The narrow gap welding process is performed preferably with a welding robot or an electro-mechanical welding carriage. The seam on the outside of the cylinder can then be welded by hand.

If the cylinders are grooved, the weld can be either between the grooves in the cylinder or in one of the cylinder grooves.

The weld formed can then be re-machined at the place of operation if necessary, however this can also be done with smaller machine tools.

The finish-welded Yankee cylinder can then be ground, coated and re-ground at the future place of operation, preferably using a mobile auxiliary structure.

In the following, the invention is described on the basis of drawings.

Figure 2:
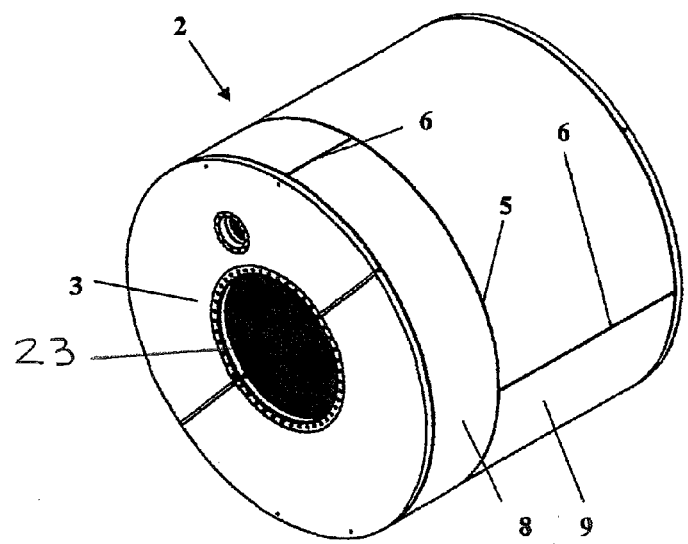
Figure 3A:
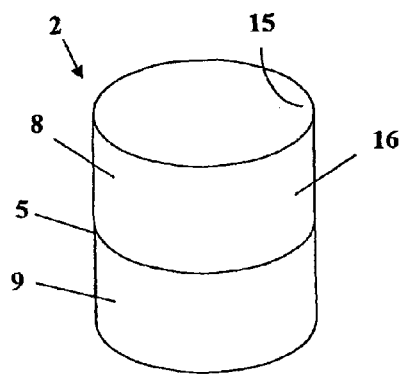
Figure 3B:
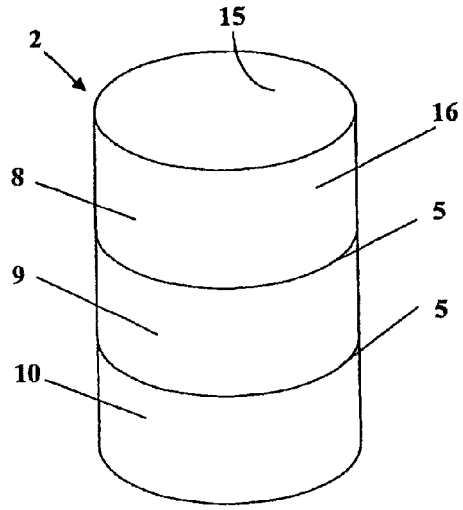
Figure 4A:
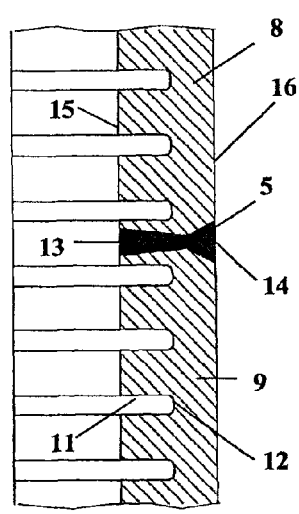

Here:

FIG. 1 shows a Yankee cylinder made of steel;
FIG. 2 shows the fully assembled cylinder shell;
FIGS. 3a and 3b show the possible location of the welds;
FIGS. 4a, b, and c show different versions of the weld;
Identical reference figures in the individual figures refer to the same components in each case.

FIG. 1 shows a Yankee cylinder 1. It comprises a cylindrical steel shell 2, which is welded or bolted to the two end covers 3 and 4.

Inside the Yankee cylinder 1 there is a central shaft 7 with the central part 21 and the two bearing journals 20, which rotate in the bearings 17.

Steam is fed to the Yankee cylinder 1 during operation through the steam feed 18. Exhaust steam and condensate are discharged from the Yankee cylinder through the condensate piping 22 and 19, respectively.

There are a large number of grooves 11 on the inside of the cylinder 15, which run in the circumferential direction of the Yankee cylinder 1. The heat transition to the outside of the cylinder 16 is enhanced by the grooves 11 and condensate removal is facilitated.

In the state-of-the-art manufacturing process used to date, individual shell plates are cut, curled, and welded together to form cylinder sections. After this, the entire cylinder shell is machined on the inside and outside, as well as on the end faces. Finally, the end face covers are bolted or welded on. Very large machines are needed for mechanical lathing, especially for manufacture of very large Yankee cylinders over five meters long. The finished Yankee cylinder is then transported to its place of operation on suitable transport vehicles.

In the present invention, individual steel shell plates are cut and curled in a first step a.). In a second step b.), the shell plates are welded together to form two or more cylinder sections 8, 9, 10. These two steps a.) and b.) are carried out at the manufacturing location, for example on the works premises of a plant engineering company. The cylinder sections 8, 9, 10 are then machined on the inside 15 and on the end faces, preferably at the manufacturing location. This mechanical lathing can now be performed with much smaller machines than those used hitherto, with a machining height of only 3 m instead of 6 m, for example. Ideally, the individual cylinder sections 8, 9, 10 are fully finish-machined on the inside 15 at the manufacturing location.

The individual cylinder sections 8, 9, 10 are then stabilized or secured accordingly, loaded on suitable transport vehicles, and transported to the place of installation. The preferably finish-machined cylinder sections 8, 9, 10 are not welded together to form a complete cylinder shell 2 until they reach the place of installation.

Before welding the individual cylinder sections 8, 9, 10 together, the two end covers 3 and 4 can be mounted on the end faces. This assembly stage is preferably carried out at the manufacturing location because the cylinder sections 8, 9, 10 are stabilized by the end faces 3, 4 connected to them.

FIG. 2 shows an example of a fully assembled cylinder shell 2. The figure shows the two cylinder sections 8 and 9 and the two welds 6, which join the curled shell plates to form one cylinder section 8, 9, 10. One cylinder section 8, 9, 10 can be formed by joining several individual shell plates together. FIG. 2 shows the circumferential seam 5 welded in process step d.) and which joins the two cylinder sections 8 and 9. This seam 5 was not welded until the individual cylinder sections 8, 9 had been finish-machined.

For example, the cylinder shell 2 can be made up of two individual cylinder sections 8, 9, as is shown in FIGS. 2 and 3a, however it can also be made up of three or more individual cylinder sections 8, 9, 10, as shown in FIG. 3b.

The so-called narrow groove welding process is particularly suitable for welding the individual cylinder sections 8, 9, 10 together. Narrow gap welding is a well-established process in welding circles and one which minimizes the amount of heat applied to the material, thus also minimizing heat distortion. In this process, gaps are welded measuring between 2 and 20 mm, preferably using TIG welding and with an oscillating electrode and/or a narrow gap torch.

This welding process can be performed, at least from the inside 15, by a mobile welding robot or an electro-mechanical welding carriage, which runs on an auxiliary rail mounted on the cylinder sections 8, 9, 10. A welding robot of this kind can also be transported easily to the future place of operation of the Yankee cylinder 1.

Figure 4B:
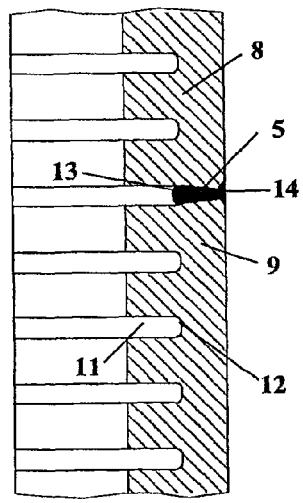
Figure 4C:
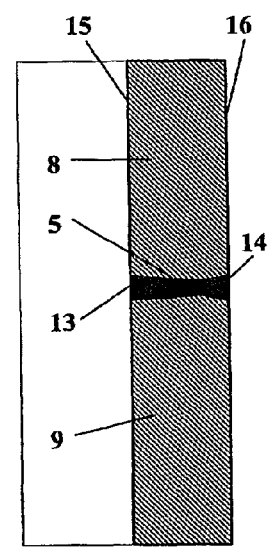

FIGS. 4a to 4c show different versions of the welded joint 5 between the cylinder sections 8 and 9.

In pressure vessels like a Yankee cylinder 1, the welded joint 5 is usually formed by an inner weld 13 on the inside of the cylinder 15 and an outer weld 14 on the outside of the cylinder 16.

FIGS. 4a and 4b show a cylinder shell 2 with grooves 11 on the inside 15 of the cylinder. The inner seam 13 can be welded between two grooves 11, as is shown in FIG. 4a, or in one groove 11, thus on the base of the groove 12. An inner weld 13 of this type is shown in FIG. 4b.

FIG. 4c shows an inner weld 13 and an outer weld 14 on a cylinder shell 2 without grooves.

The invention claimed is:

1. A process for manufacturing a steel Yankee cylinder, comprising the following steps:
   a.) cutting and curling individual shell plates at a specific manufacturing location;
   b.) welding the shell plates together to form at least two cylinder sections, each with an inside, an outside, and axially spaced end faces, at the manufacturing location;
   c.) transporting the individual cylinder sections from the manufacturing location to an assembly location;
   d.) welding the individual cylinder sections together at adjacent end faces at the assembly location to form a complete cylindrical shell surface of the Yankee cylinder, wherein a length of the complete cylindrical shell surface is at least 5 meters and the assembly location is a paper or tissue production plant;
   e) attaching at least one end cover to at least one of the individual cylinder sections after one of steps b.), c.) or d.); and
   f) wherein step d.) is performed, at least from one side, by a narrow gap welding process using a mobile welding robot or an electro-mechanical welding carriage placed inside the individual cylinder sections.

2. The process according to claim 1, wherein the individual cylinder sections are finish-machined on a lathe on the inside at the manufacturing location.

3. The process according to claim 1, wherein the individual cylinder sections are finish-machined on their respective end faces at the manufacturing location.

4. The process according to claim 1, wherein the individual cylinder sections have circumferential grooves which are made on the inside of the individual cylinder sections at the manufacturing location.

5. The process according to claim 1, wherein the individual cylinder sections are also finish-machined on a lathe on the outside at the manufacturing location.

6. The process according to claim 1, wherein end covers are attached to respective cylinder sections at the manufacturing location.

7. The process according to claim 1, wherein step d.) is performed, at least from one side, by the mobile welding robot or electro-mechanical welding carriage that runs on an auxiliary rail mounted on the individual cylinder sections.

8. The process according to claim 1, wherein the fully welded cylindrical shell surface of the Yankee cylinder is coated and ground at a future place of operation.

9. The process according to claim 2, wherein the individual cylinder sections are finish-machined on their respective end faces at the manufacturing location.

10. The process according to claim 2, wherein the individual cylinder sections have circumferential grooves which are made on the inside of the individual cylinder sections at the manufacturing location.

11. The process according to claim 2, wherein the individual cylinder sections are also finish-machined on a lathe on the outside at the manufacturing location.

12. The process according to claim 2, wherein end covers are attached to respective cylinder sections at the manufacturing location.

13. The process according to claim 9, wherein the individual cylinder sections have circumferential grooves which are made on the inside of the individual cylinder sections at the manufacturing location.

14. The process according to claim 9, wherein the individual cylinder sections are also finish-machined on a lathe on the outside at the manufacturing location.

15. The process according to claim 13, wherein the end cover are attached to respective cylinder sections at the manufacturing location.

16. The process according to claim 1, further comprising the step of stabilizing at least one of the individual cylinder section with an auxiliary structure made of steel at the manufacturing location.

17. The process according to claim 1, wherein no lathing or milling of the Yankee cylinder needs to be performed at the assembly location.

18. A process for manufacturing a steel Yankee cylinder, comprising the following steps:
   a.) cutting and curling individual shell plates at a specific manufacturing location;
   b.) welding the shell plates together to form at least two cylinder sections, each with an inside, an outside, and axially spaced end faces, at the manufacturing location;
   c.) providing the individual cylinder sections with circumferential grooves on an inside surface at the manufacturing location;
   d.) performing finish-machining on the individual cylinder sections at the manufacturing location;
   e.) attaching two end covers to two individual cylinder sections, one end cover per cylinder section, at the manufacturing location;
   f.) transporting the individual cylinder sections and any attached end covers from the manufacturing location to an assembly location, wherein the assembly location is a paper or tissue production plant; and
   g.) welding the individual cylinder sections together at adjacent end faces at the assembly location at least from one side and using a narrow gap welding process using a mobile welding robot or an electro-mechanical welding carriage placed inside the individual cylinder sections, wherein a length of a complete cylindrical shell of said Yankee cylinder is at least 5 meters.

* * * * *